United States Patent
Litva et al.

(10) Patent No.: US 9,635,048 B2
(45) Date of Patent: Apr. 25, 2017

(54) METHOD AND SYSTEM FOR DYNAMIC PLATFORM SECURITY IN A DEVICE OPERATING SYSTEM

(75) Inventors: Paul Litva, Ottawa (CA); David Jones, Ottawa (CA); Ron Vandergeest, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 126 days.

(21) Appl. No.: 14/003,502

(22) PCT Filed: Mar. 9, 2011
(Under 37 CFR 1.47)

(86) PCT No.: PCT/CA2011/050135
§ 371 (c)(1),
(2), (4) Date: Aug. 7, 2014

(87) PCT Pub. No.: WO2012/119218
PCT Pub. Date: Sep. 13, 2012

(65) Prior Publication Data
US 2015/0040224 A1 Feb. 5, 2015

(51) Int. Cl.
*G06F 12/14* (2006.01)
*H04L 29/06* (2006.01)
(Continued)

(52) U.S. Cl.
CPC ........ *H04L 63/1441* (2013.01); *G06F 21/554* (2013.01); *G06F 21/575* (2013.01);
(Continued)

(58) Field of Classification Search
CPC .......................... H04L 63/1441; G06F 621/554
(Continued)

(56) References Cited

U.S. PATENT DOCUMENTS

| 7,096,368 | B2 * | 8/2006 | Kouznetsov | G06F 21/56 713/189 |
| 7,979,844 | B2 * | 7/2011 | Srinivasan | G06F 8/314 717/104 |

(Continued)

FOREIGN PATENT DOCUMENTS

| DE | 10252347 A1 | 5/2004 |
| EP | 1628222 A2 | 2/2006 |

(Continued)

OTHER PUBLICATIONS

Extended European Search Report cited in corresponding European Application No. 11860634.2 dated Jul. 17, 2014.
(Continued)

*Primary Examiner* — Abu Sholeman
(74) *Attorney, Agent, or Firm* — Rimon, P.C.; Marc S. Kaufman

(57) ABSTRACT

A system and method is provided for implementing platform security on a consumer electronic device having an open development platform. The device is of the type which includes an abstraction layer operable between device hardware and application software. A secure software agent is provided for embedding within the abstraction layer forming the operating system. A secure store is provided for storing security information unique to one or more instances of the application software. The secure software agent uses the security information for continuous runtime assurance of ongoing operational integrity of the operating system and application software and thus operational integrity of the device.

28 Claims, 11 Drawing Sheets

(51) Int. Cl.
  *G06F 21/55* (2013.01)
  *G06F 21/57* (2013.01)
  *G06F 21/62* (2013.01)
  *H04W 12/08* (2009.01)
  *G06F 17/00* (2006.01)

(52) U.S. Cl.
  CPC ............ *G06F 21/62* (2013.01); *H04W 12/08* (2013.01); *G06F 2221/2141* (2013.01)

(58) Field of Classification Search
  USPC .......................... 713/1, 177, 191; 726/23, 27
  See application file for complete search history.

(56) References Cited

U.S. PATENT DOCUMENTS

| | | | | |
|---|---|---|---|---|
| 8,606,911 | B2* | 12/2013 | Raleigh | H04L 12/14 707/694 |
| 2002/0174359 | A1 | 11/2002 | Haltmeyer | |
| 2004/0025016 | A1* | 2/2004 | Focke | G06F 9/45537 713/164 |
| 2004/0078565 | A1* | 4/2004 | Hofmeister et al. | 713/156 |
| 2005/0198645 | A1 | 9/2005 | Marr et al. | |
| 2006/0230388 | A1 | 10/2006 | Hatlelid et al. | |
| 2007/0005957 | A1* | 1/2007 | Sahita | G06F 21/554 713/156 |
| 2007/0050848 | A1 | 3/2007 | Khalid | |
| 2008/0165952 | A1* | 7/2008 | Smith et al. | 380/28 |
| 2008/0244747 | A1* | 10/2008 | Gleichauf | G06F 11/1415 726/25 |
| 2009/0038017 | A1* | 2/2009 | Durham et al. | 726/27 |
| 2009/0254572 | A1 | 10/2009 | Redlich et al. | |
| 2010/0083381 | A1 | 4/2010 | Khosravi et al. | |
| 2011/0078799 | A1* | 3/2011 | Sahita | G06F 21/53 726/26 |
| 2013/0333040 | A1* | 12/2013 | Diehl | G06F 9/46 726/24 |

FOREIGN PATENT DOCUMENTS

| | | |
|---|---|---|
| WO | 0072149 A1 | 11/2000 |
| WO | WO2004034184 | 5/2004 |

OTHER PUBLICATIONS

Henry Hanping Feng et al., "Anomaly detection using call stack information", Proceedings of the 2003 IEEE Symposium on Security and Privacy. S&P 2003, Berkeley, CA May 11-14, 2003.
International Search Report and Written Opinion mailed Nov. 16, 2011; PCT/CA2011/050135.

* cited by examiner

METHOD AND SYSTEM FOR DYNAMIC PLATFORM SECURITY IN A DEVICE OPERATING SYSTEM

FIELD OF THE INVENTION

The present invention relates generally to mitigating security threats and recovering from security breaches on electronic devices. More particularly, the present invention relates to: (a) preventing unauthorized use and access of an electronic device and digital assets such as games, applications, e-books, video files, text files and other digital data considered of value on that electronic device using a secure software agent embedded in the device; (b) providing a means to mitigate the damage that may be caused by automated attacks that may occur by installing secure software agents that are diverse from on agent to the next; and (c) providing a means to recover from attacks that may occur by updating the secure software agent with one that is diverse from the original agent in functionality (for example, introducing additional security checks) and structure (for example, by re-ordering the location of binary code in the agent).

BACKGROUND OF THE INVENTION

Devices such as mobile phones, tablets, games consoles, set top boxes, televisions, personal navigation devices, and other consumer electronics devices (or simply "devices") are typically purchased by consumers from retail distribution channels (e.g., consumer electronics stores) or may be sold to or leased to consumers by service providers (or simply "operators")—e.g., mobile network operators, broadcast television network providers, or Internet video providers. Traditionally, such devices were closed devices or embedded devices that were based on proprietary hardware and operating systems and that did not support third party software applications. However, such devices have increasingly become open devices. It should be understood that "open" in the context of this background discussion can include varying degrees including, but not limited to, standard hardware (such as a system on a chip based on an Intel or ARM processor), open source operating systems and software, open or published APIs to enable third party applications development, and/or freely modifiable programming.

Such devices may include open source operating systems, including those such as Linux (an open source Unix-type operating system originally created by Linus Torvalds with the assistance of developers around the world) or Android (an open source mobile operating system based on a modified version of the Linux kernel and marketed by Google, Inc. of Mountain View, Calif.).

Attacks on closed or embedded devices, in the form of unauthorized use and access, have taken place for many years. However, such hacking of embedded devices has been a specialized and highly technical process that required a specialized combination of hardware and software skills. In contrast, open devices have hardware and operating systems that are well understood by many developers and hackers. Accordingly, this trend to open devices greatly increases the potential number of hackers with knowledge and expertise that renders such open devices much more susceptible to attack. Such open devices also support the capability for third party application developers to develop applications for those device (e.g., open API's) and hence such devices also increasingly support the capability for consumers to download, install, and execute third-party software applications (or simply "applications") on such devices. Such applications are not developed by the operator or the original equipment manufacturer (or simply "OEM" which could include companies such as Apple Inc., of Cupertino, Calif.) of the device. In terms of software design, such applications may be developed using a script language (e.g., JavaScript) or native code (e.g., a C or C++ program).

The capability for consumers to purchase or lease and to download and install third-party software applications on devices may be provided by the OEM (e.g. Apple Inc.), an operator, or a company that is unaffiliated with the OEM or operator typically via an Internet-based retail interface—e.g., the iTunes Store or the Android Market (software-based online digital media stores operated by Apple Inc. and Google Inc., respectively). Internet-based retail interface provides a system by which the third-party application developer (or simply "developer") shares part of the revenue from sales of an application with the Internet-based retail interface provider. The trend to enable consumers to download and install such third-party applications (or simply "apps") on devices also increases the potential security concerns for consumers, operators, developers and OEM's beyond those that would normally be associated with an embedded device.

One such security concern is malware whereby the third-party software sold to the consumer may contain malicious software known as malware (e.g., worms, viruses, Trojans, rootkits, and backdoors). Such malware may cause a breach of consumer privacy—e.g., malware on a mobile phone might monitor a user's position via the GPS capabilities of the mobile phone and transmit such positional data to a remote server. Malware may also cause identity theft or fraudulent use of the device or related services—e.g., malware on a mobile phone could automatically dial services which add charges to a user's mobile phone subscription. Malware may also cause network stability problems for operators—e.g., malware on mobile phones could inappropriately use network capabilities such as SMS or mobile voice calling to create a denial of service attack against a mobile network operator's network impacting the network service quality or availability.

Another significant security concern is application piracy. Here, applications are subject to piracy whereby a consumer may obtain a copy of the application for free and install it on their device or on a similar device that is not authorized or supported by the provider of the Internet-based retail interface. Application piracy causes the provider of the Internet-based retail interface and the developer to generate less revenue than they would in the absence of application piracy.

Additional security concerns include unauthorized applications. Providers of Internet-based retail interfaces may "certify" applications to ensure that malware is not present in the applications sold through their Internet-based retail interfaces. This serves to provide some level of protection against the malware concerns noted above and to prevent applications from otherwise compromising the security of the device and/or device network (i.e., mobile network). If this certification process can be circumvented or is not exhaustive, then consumers may unknowingly download malware onto their devices from an unauthorized Internet-based retail interface or other Internet web site. If this certification process can be circumvented or is not adequate to detect potential malware then consumers may unknowingly download malware onto their devices from an Internet-based retail interface.

Another important security concern involves content piracy. It is known that media applications (e.g., a video player, music player or e-book reader) may be used on devices by consumers to access high value digital content, such as digital video, music or electronic publications, that is licensed from media content providers (e.g., a movie studio, music producer, or book publisher) by the providers of Internet-based retail interfaces for sale to consumers. A hostile user (e.g., a content pirate) may install software on a device owned by the hostile user to enable the hostile user to access cryptographic keys used by a media application to decrypt content, siphon digital content (i.e., capture decrypted, compressed digital content at some point in the media rendering path) or "screen scrape" digital content (i.e., capture decrypted, decompressed digital content at some point in the media rendering path). Such captured media content could therefore be used and reproduced without further control or approval by the media content providers.

Existing approaches to platform security (i.e., security intended to address one or more of the security problems noted above) typically involve one or more of the following methods further grouped and described herein below.

"Operating system security" is a security method whereby one or more functions or capabilities including process isolation, access control, private application programming interfaces (APIs), and application certification/signing, and application licensing services may be provided by an operating system. Such functions and capabilities are further described as follows.

"Process isolation" may be supported by the operating system (or a hypervisor installed beneath the operating system) to ensure that each application and parts of the system runs in its own process and dedicated memory space such that, by default, no application has the capability to perform any operation that could adversely affect another application, the operating system (OS), or the consumer. Each application process can be considered to be running in its own operating environment often referred to as its own "sandbox." However, to develop applications that are useful to users, most applications must be able to access operating system services (e.g., on a mobile phone OS, send short message service (SMS) text messages, get user location, record phone calls, take pictures, or the like) that are not supported within the basic sandbox. This limits the effectiveness of process isolation or the "sandbox" as the application must access operating system services outside the sandbox which increases the probability that the application may perform operations that negatively affect other applications, the OS, or the consumer.

"Access control" involves the ability to address the requirement for applications to use OS services or resources outside the sandbox or for native applications, OS services or resources that could enable a native application to adversely affect other applications, the consumer or a network. Here, the OS includes access control functionality that makes decisions about whether to grant such access to a requesting application. This access control functionality may be combined with the concept of permissions. For example in the Android OS from Google Inc., application developers must declare the permissions required by their applications in an associated manifest file to enable the application to perform any operation that might adversely affect other applications, the OS, or the consumer. Access control decisions may also be based on the privileges inherently granted to an application (e.g., user application or root access in the Linux OS). One of the problems associated with permissions is related to the question of who or what grants permissions to an application and whether the grantor understands the implications of such approval (e.g., in the Android OS case it is the consumer that grants such permissions). Another problem is that such permissions may be modified by malware or an attacker following such grant of permissions by the consumer or the certifying authority. Some operating systems have access control frameworks that enable different access control models to be implemented (e.g., Linux Security Module (LSM)). LSM enables different access control models and functions to be implemented as loadable kernel modules.

"Private APIs" are another mechanism to limit the ability of applications to access operating system services or resources that may adversely affect platform security. Here, although many system API's may be open or public, the OEM may limit access to certain operating system services by maintaining the secrecy of API's required to access such services from applications developers. This is normally coupled with an application certification process to ensure that applications submitted for certification do not attempt to call such private API's.

"Application certification/signing" involves various existing application certification processes in current use that ensure applications do not perform malicious operations and/or access private API's. These processes generally include static verification (e.g., scanning the object code prior to execution) of the application (e.g., to verify that private API's are not called by the application) and dynamic verification (e.g. to verify the "stability" of the application during execution). If the Application passes the certification process it is then digitally signed by the certifying authority (which may also be the Internet-based retail interface provider) in a form that can later be verified. One of the problems with current application certification schemes is that a comprehensive verification is not readily automated and, hence, is not exhaustive. Because of this, a malicious operation could be embedded in the application in such a manner that it will only execute at a pre-specified time following the application certification/signing process. Accordingly, such malicious operation can avoid detection during the verification process. Another problem with application certification is the sheer number of applications that may have to be certified by an Internet-based retail interface provider. For example, it is estimated that the App Store (an Internet-based retail interface offered by Apple Inc. for providing mobile software applications for their iPhone™ brand smartphone) has over 300,000 applications and that there are 10,000 new applications submitted to Apple Inc. each week. This makes it cost-prohibitive to perform exhaustive verification of applications before certification. Another problem is that a hacker could modify or replace the root of trust in the OS (i.e., a digital certificate and software) used to verify the integrity of the application against the signature generated by the Internet-based retail interface provider such that the application can be modified following application certification/signing, such that the permissions associated with the application can be modified, such that a hostile third party could load an unauthorized application onto the device or such that a pirated application can be loaded onto the device by a consumer.

"Application licensing services" involves protection against application piracy whereby the system provides a license service. For example, the Android OS provides a licensing service that lets an application developer enforce licensing policies for paid applications. However, these types of application licensing services can be readily circumvented by hackers by modifying the application to extract such license verification checks.

In addition to the problems noted in each of the above functions and capabilities found within platform security, there is a problem that is common to process isolation, access control, and application licensing services whereby the portions of the OS that support such security functions can be subverted or bypassed by modifying portions of the operating system that perform such functions. To prevent such changes to the OS security functions or other OS functions, a further method of utilizing a "secure boot loader" is often implemented in devices.

A "secure boot loader" (or "secure boot" for short) is used to ensure that only the intended boot software and OS kernel are loaded onto the device. Here, the authentication compares the applicable software against a signature generated by the device OEM. The authentication or integrity verification of the boot software and the OS kernel occur only during device start-up such that this mechanism can be circumvented by dynamic attacks occurring during the boot process. Once the secure boot loader has been bypassed, the OS can be modified to bypass other security functions that may be present in the OS. These dynamic attacks can be highly automated so that they are accessible by consumers that do not otherwise have the technical skills to independently implement such attacks (i.e., jailbreaking techniques). Moreover, there is no way to restore device security for devices already deployed in the field once the secure boot process has been compromised.

In addition to the problems noted above relating to platform security, there is a problem that is common to process isolation, access control, application licensing services, virtual machines, and secure boot loaders that relates to the ability to recover from an attack. Generally, once an attack has occurred there is no mechanism in place to recover platform security for devices that have been sold or licensed or otherwise distributed to consumers. We refer to this as "static security" because the assumption inherent in the design of such platform security is that the platform security mechanisms put in place will resist any and all attacks during the useful lifespan of the device. Static security is often attacked and such attacks are then "packaged" into automated attacks that can be implemented by the average consumer (e.g., the known jailbreak attack on the iPhone™ developed by Apple™).

"Virus detection and intrusion prevention software" is another security method used to detect malware and mitigate any damage that such malware may cause. To date, nearly every solution to detect malware on devices, such as mobile phones, has relied upon the same "signature"-based mechanisms that personal computer (PC) anti-virus solutions have used for years. The term "signature" here does not involve a digital signature, but rather a set of attributes by which a specific piece of malware can be identified—e.g., an attribute such as being of a specific length and having a specific sequence of bytes at a certain location within it. However, these signatures are only understood once the malware has been deployed, meaning the malware may have already caused damage. Additionally, these signature-based types of solutions must be constantly updated and must be able to detect 10's of thousands of malware signatures. These alone cannot be relied upon as the only means of detecting and preventing damage from malware on devices. Additionally, anti-virus software itself can be modified or disabled by malware to prevent such detection.

"Virtual machines" is yet another security method used to apply platform security. Virtual machines, such as the Java™ virtual machine (JVM), are designed to allow the safe execution of applications obtained from potentially untrusted sources. The JVM accepts a form of computer intermediate language commonly referred to as Java™ bytecode which is a programming language conceptually representing the instruction set of a stack-oriented, capability architecture from Oracle Corporation of Redwood Shores, Calif. Java™ applications run in a restricted sandbox which is designed to protect the user from misbehaving code or malware. This comes with performance limitations and limitations in terms of the functionality—e.g., applications are prevented from accessing operating system functions and resources that are deemed to be "hazardous".

Each of the aforementioned security methods form part of a static platform security functionality 100 as shown in prior art FIG. 1. Additionally, secure bootstrap loading 110 as shown in FIG. 1 is well known, for example within U.S. Pat. No. 6,185,678 issued to Arbaugh et al. on Feb. 6, 2001, and not further described herein.

"Media application obfuscation", is a security method which can be used in conjunction with platform security, or in cases where platform security does not exist, whereby software obfuscation techniques may be applied to media applications to prevent cryptographic keys that are used to decrypt the content from being discovered by a hostile user and to prevent media siphoning or screen scraping attacks on the media playback path. There are four problems that arise in protecting the media playback path. First, the media playback path may be implemented by the OEM or another third party that gives the provider of the media application limited ability to implement obfuscation techniques within the media playback path. Second, obfuscating the media playback path can introduce additional central processing unit (CPU) overhead which could increase the power consumption of a device, and introduce delays in the functioning of the application or other applications on the device. Third, the high data rates of certain media types (e.g., high definition video) associated with decompressed high definition video may limit the ability to obfuscate the media playback path. Finally, the hardware used to render the media (i.e., a graphics processing unit (GPU)) may not be secure or may have secure API's that are not commercially accessible to the media application provider, in order to prevent screen scraping type attacks.

It is, therefore, desirable to provide a security mechanism that overcomes the problems associated with previous methods of preventing unauthorized use of a device and digital assets on that device and the limitations of static platform security.

SUMMARY OF THE INVENTION

It is an object of the present invention to obviate or mitigate at least one disadvantage of previous platform security methods and mechanisms. More specifically, the present invention addresses the deficiencies of previous platform security methods and mechanisms in terms of improving security against at least application piracy, malware, unauthorized applications, and content piracy.

In a first embodiment, the present invention provides a system for improving security of a device, the system including: an abstraction layer operable between device hardware and application software; a secure software agent embedded within the abstraction layer; and a secure store for storing security information unique to the application software for continuous runtime use by the secure software agent to assure ongoing integrity of the system.

In a further embodiment, there is provided a method of improving security of a device where the device includes an abstraction layer operable between device hardware and application software, the method including: embedding a secure software agent within the abstraction layer; and providing a secure store for storing security information unique to the application software for continuous runtime use by the secure software agent to assure ongoing operational integrity of the device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Figure 1:
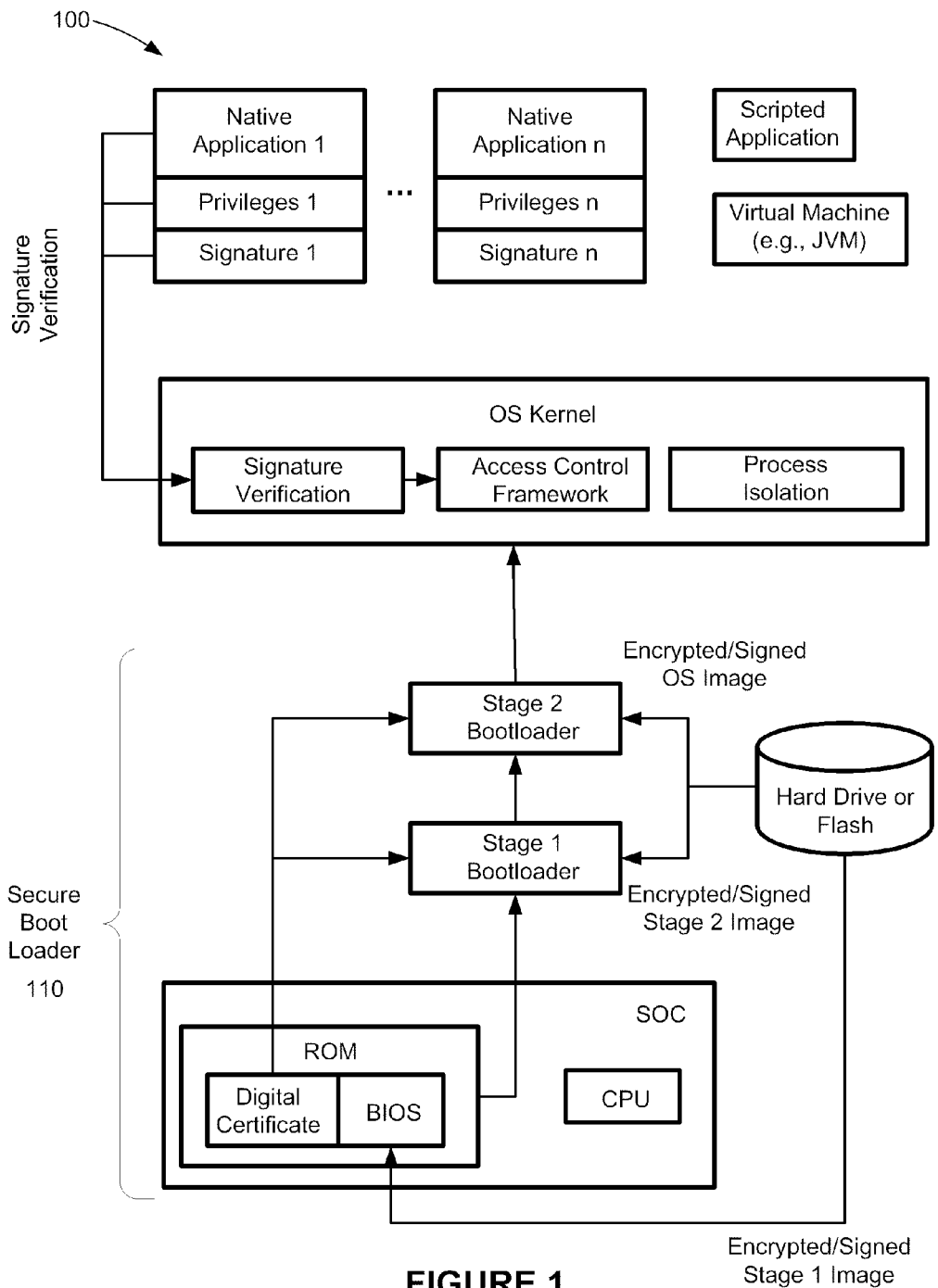
FIG. 1 is a schematic representing prior art static platform security functionality.

Generally, the present invention provides a method and system for renewable or "dynamic" platform security. Though applicable to any mobile phones, games consoles, tablets, set top boxes, televisions or other consumer electronic devices, the present invention will be described in terms of such devices that use an open OS such as, but not limited to, the Linux or Android™ OS. In particular, the preferred embodiment will be shown and described relative to the Android™ OS for purposes of illustration only and should not be construed as limiting the intended scope of the present invention. Indeed, advantages of the present invention in terms of countering malware, application piracy or modification, improving platform access control, and securing media playback on devices are universally applicable to any device OS with particular usefulness to any open device as a result of the inherently greater security risks associated with such open devices. Moreover, the present invention is intended as a new method and system of application control and which is usable with, and in addition to, existing platform security.

With reference to FIG. 2, an overall layer schematic 200 is shown to indicate the present invention as implemented in an Android™ OS embodiment. Here, the basic architecture of the present invention is seen to include a layered execution stack. The base layer 219 involves typical system on a chip (SOC) components including a central processing unit (CPU), graphics processing unit (GPU), and memory (read only memory (ROM)) within which the basic input/output system (BIOS) resides. The highest layer in FIG. 2 is the device application shown here as one or more Android™ applications 210a, 210b. Intervening layers include the various known software and hardware elements including a hard disk drive (HDD) storage device or flash memory 220, the OS kernel 215 and OS kernel application interface layer 214 which manages system calls between the OS native applications 223 and the Android™ OS 213. In accordance with the present invention, the layered execution stack further includes a Java™ access control (JAC) layer 212 between the Android™ OS 213 and the virtual machine (VM) layer 211 (i.e., Dalvik, which is the Android™ VM that forms an integral part of the Android™ OS). The VM layer serves to convert the given application into a compact executable form (i.e., the ".dex" format in terms of Android™ applications) suitable for execution in a known manner on the given device. The JAC layer 212 serves to provide secure access control by authenticating communication between the machine executable code of the VM layer 211 and a security agent (or simply "agent") 217. Such access control functionality may include any suitable known mechanism that provides a bridge between scripted apps and the native agent to allow the agent to verify the integrity of the scripted application thereby extending the range of "applications" to scripted applications. It should further be understood that if all applications are assumed to be native applications 224, then the JAC layer 212 would not be required.

It should be understood that the present invention may be implemented in conjunction with known static platform security functionality 100 as shown in FIG. 1. More specifically, the present invention incorporates existing OS system security functions, such as process isolation, by ensuring that the portions of the operating system that perform such functions are not modified during the boot process or during run time. As well, the present invention complements existing secure boot loader functions (Stage 1 Bootloader 221 and Stage 2 Bootloader 222 as shown in FIG. 2) by verifying that the correct secure boot loader path was followed and by dynamically verifying the integrity of the OS and boot loader. It should be understood that such secure boot loader only functions as such during start-up.

In accordance with the present invention, the agent 217 is embedded in the OS kernel 215. The agent 217 is Linux Security Module interface (LSM I/F) compliant. LSM is not further discussed herein as it is a known framework (which is applicable to Android™ as well as Linux distributions) that allows the Linux kernel to support a variety of computer security models without favoring any single security implementation. In order to render the agent 217 resistant to tampering, modification, and reverse engineering attacks, the agent 217 is itself protected using known software protection techniques such as, but not limited to, those described in more detail in U.S. Pat. Nos. 6,594,761, 6,779,114, 6,842,862, and 7,506,177 each issued to Chow et al.

which illustrate examples of such tamper resistance that may be usable in conjunction with the present invention.

Figure 2A:
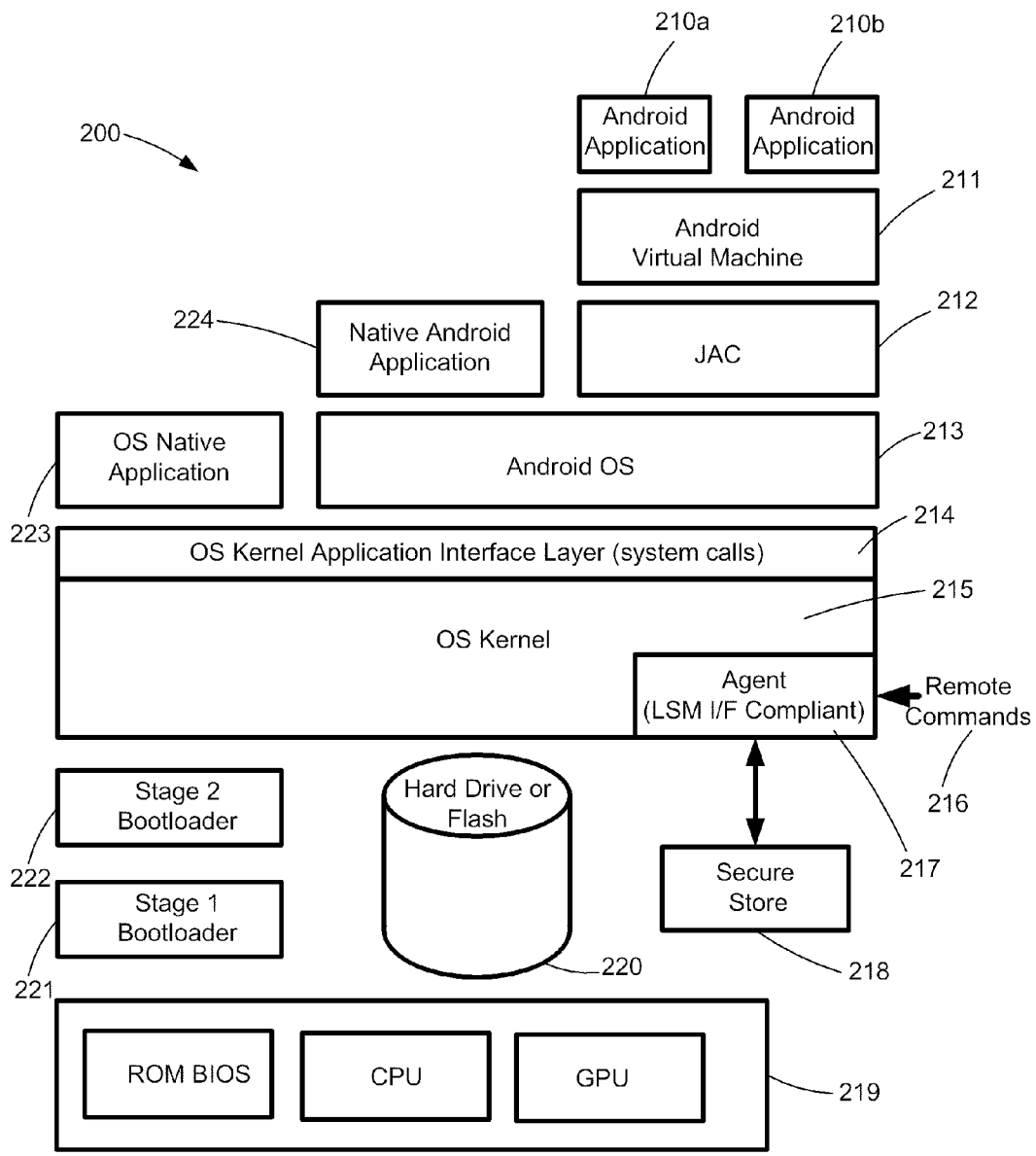
FIG. 2A is a layer schematic showing one embodiment of the present invention as applied to an Android OS.

It should be understood that the agent 217 forms an integral and un-detachable part of the OS kernel 215 without which the device OS 213 and/or the applications 210a, 210b, 224 will cease to function correctly. One example of the functions of the agent 217 is to monitor the integrity of both the OS 213 and the applications 210a, 210b, 224 loaded onto the device, and to detect any breaches of the OS 213 or secure boot 221, 222. The agent 217 maintains and has sole access to a secured data store 218 within which the agent 217 keeps information relevant for the agent's performance of kernel resource access control, integrity verification, application licensing and application resource access control. While the secure store 218 is shown in FIG. 2A as being a separate component of the inventive system, it should be understood that the secure store 218 may exist within the hard drive or flash 220 as seen in alternative embodiment 201 if FIG. 2B. Still further, the secure store 218 may exist as a secure memory within the system on a chip base layer 219 as seen in further alternative embodiment 202 in FIG. 2C.

In terms of kernel resource access control, the agent is configured to control application access to OS kernel resources and data. The access control decisions made by the agent are based on, but not limited to, factors such as: OS kernel integrity, application integrity, application context, and the privileges granted by any given trusted root authority. An access control decision based on OS kernel integrity determines whether the kernel has been modified, been replaced, been added to, or had portions removed in an unauthorized manner. The access control decision will also determine whether the secure boot process even occurred. If the OS kernel has been modified, replaced, added to or portions removed or the secure boot process cannot be positively verified, this determination would serve to invalidate many of the assumptions that the agent or an application or a secure application such as a media player would normally operate under. An access control decision based upon application integrity determines whether the application that is attempting to access OS kernel resources has been modified in any way (e.g., to insert malware into the application or by other malware) or whether the privileges associated with that application been modified (e.g., to give it privileges to access system resources that were not authorized by the certifying authority).

An access control decision based upon application context determines whether a given application is functioning in some manner outside the context of that application. Thus, the agent can make context sensitive access control decisions. For example, if a media application playing high definition video is running, then other applications should not be able to access the frame buffer as this would enable a screen scraping attack. An access control decision based upon any given trusted root authority determines application permissions relative to the authority. In other words, the present invention may support multiple application signing authorities such that the agent may grant an application signed by a highly trusted authority a greater degree of latitude in terms of access to system resources than may be granted to an application signed by a less trusted authority or an application that was not certified at all.

In terms of the agent's performance of integrity verification, the agent is configured to dynamically monitor (e.g., in memory while the software is running) the integrity of the kernel, the secure boot components, the agent itself, and all protected applications and unprotected applications to determine if any of these items have been modified in any way at any time during the execution of the given application(s) (e.g., dynamic tampering which might be implemented using a debugger).

In terms of the agent's performance of application resource control, the agent is configured to control access to application resources which may include, for example, a portion of the application that has been encrypted by the agent, or data files that are required by the application to execute (e.g., game resource files), or data to control execution of applications. Such access control decisions are based on factors such as, but not limited to, the presence of valid license data or the confirmation of the identity of the device or consumer, either of which are designed to protect applications from piracy.

The agent itself may be embodied in software and generated by diverse code portion combinations with a fixed interface. Creation of such variations in code portions can be accomplished according to known methods, or combinations of such methods, including those described in U.S. Pat. Nos. 6,594,761, 6,779,114, 6,842,862, or 7,506,177 each issued to Chow et al. or any other suitable known method. Such variations can be termed "diverse agents" or "updated agents." Diverse agents are those which have the same functionality, F, but that are structurally and semantically diverse. The objective of generating and deploying diverse agents is to prevent an automated attack—i.e., an attack developed by a sophisticated attacker that can be sufficiently automated that it is simple to use by an average consumer and that would be applicable to each and every agent deployed in some installed base of devices. Such diverse agents may be deployed across different instantiations of a device, different types of devices, devices sold in different geographic regions or by different operators, etc.

Updated agents are those whereby if an agent, A1, with functionality set F1, is deployed in the field and is compromised or attacked in some way, it is desirable to fix such vulnerability. This may be accomplished by generating an agent, A2, that incorporates the functionality F1 but which also incorporates a new functionality designed to prevent the attack on A1. This incremental functionality, F2, is such that the functionality of A2 is now F1+F2. By applying diversity capabilities to A2, it is more difficult for an attacker to isolate the software functions in A2 (e.g., through differential analysis) which implement the new functionality F2. Updated agents provide a mechanism to address attacks on devices or agents that are already deployed in the field. Such updated agents could be downloaded by consumers, pushed to the device via a software update mechanism or pulled to the device by the existing agent. Where such updates occur, it should be understood that they are accomplished by configuring the agent software for updates upon identification and analysis of any attempted or actual successful attack by a security threat. Therefore, the present invention could issue updates to the agent for attacks that are "in development" as hackers will often post information of attacks that are in development but which have not yet succeeded in reaching the attackers objectives.

Figure 2B:
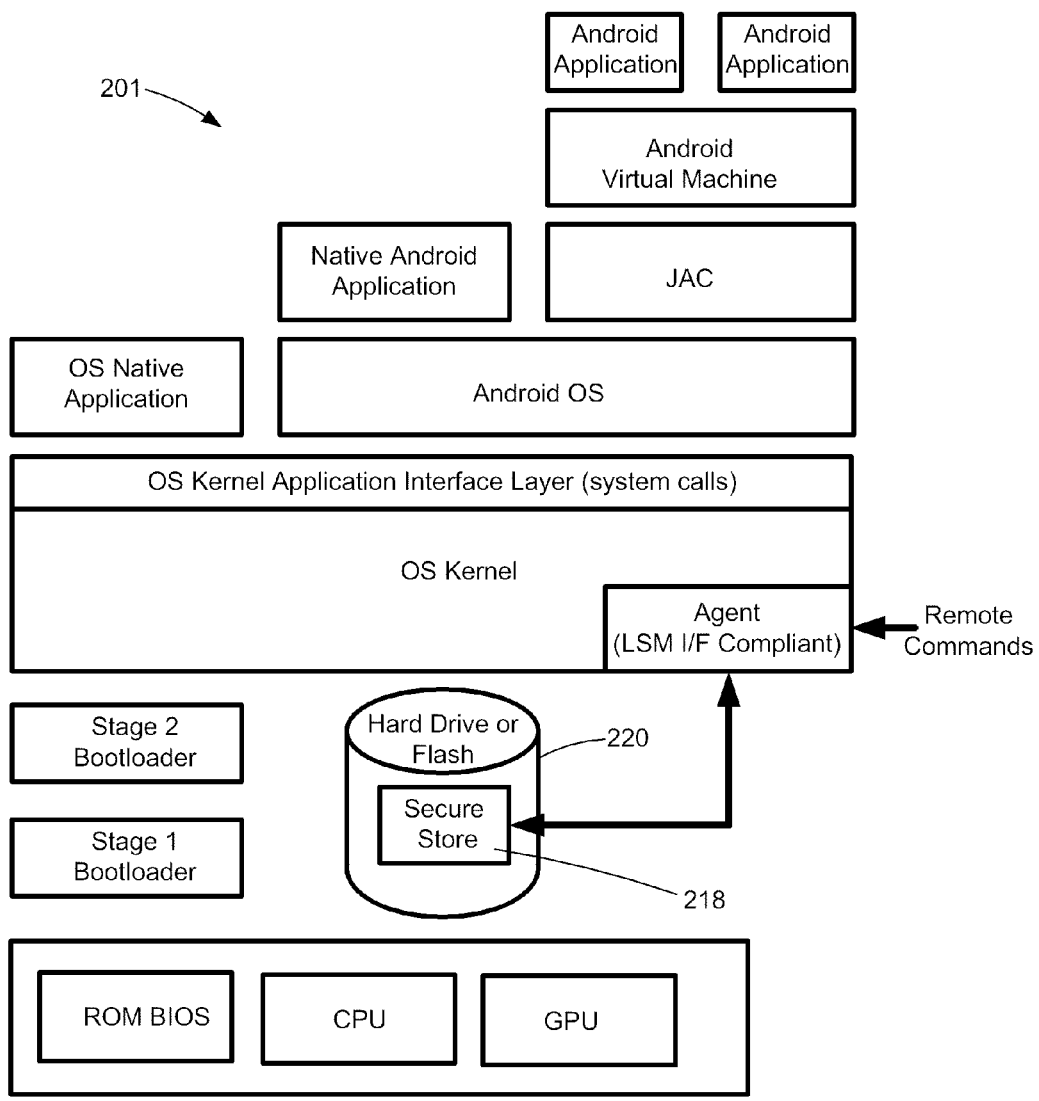
FIG. 2B is a layer schematic showing another embodiment of the present invention as applied to an Android OS.
Figure 2C:
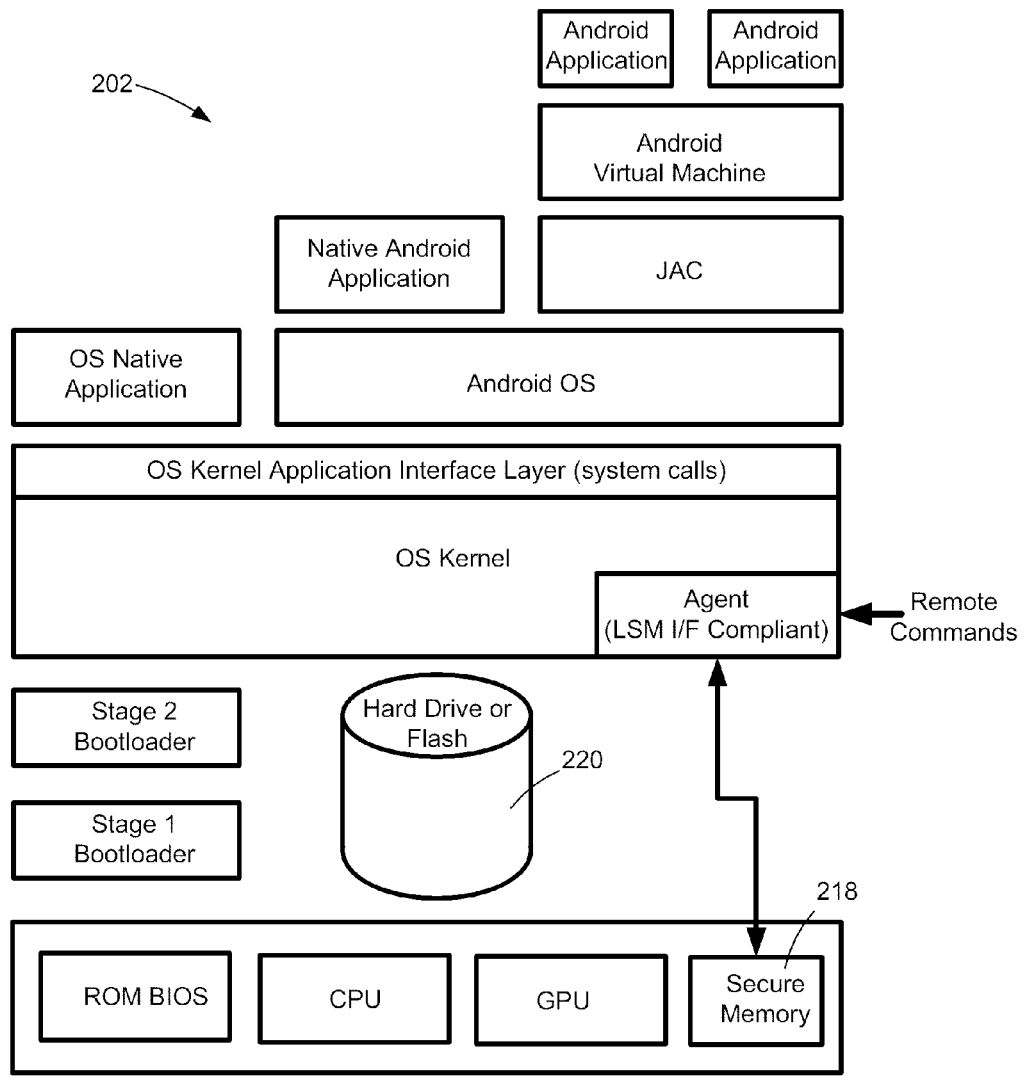
FIG. 2C is a layer schematic showing yet another embodiment of the present invention as applied to an Android OS.
Figure 3:
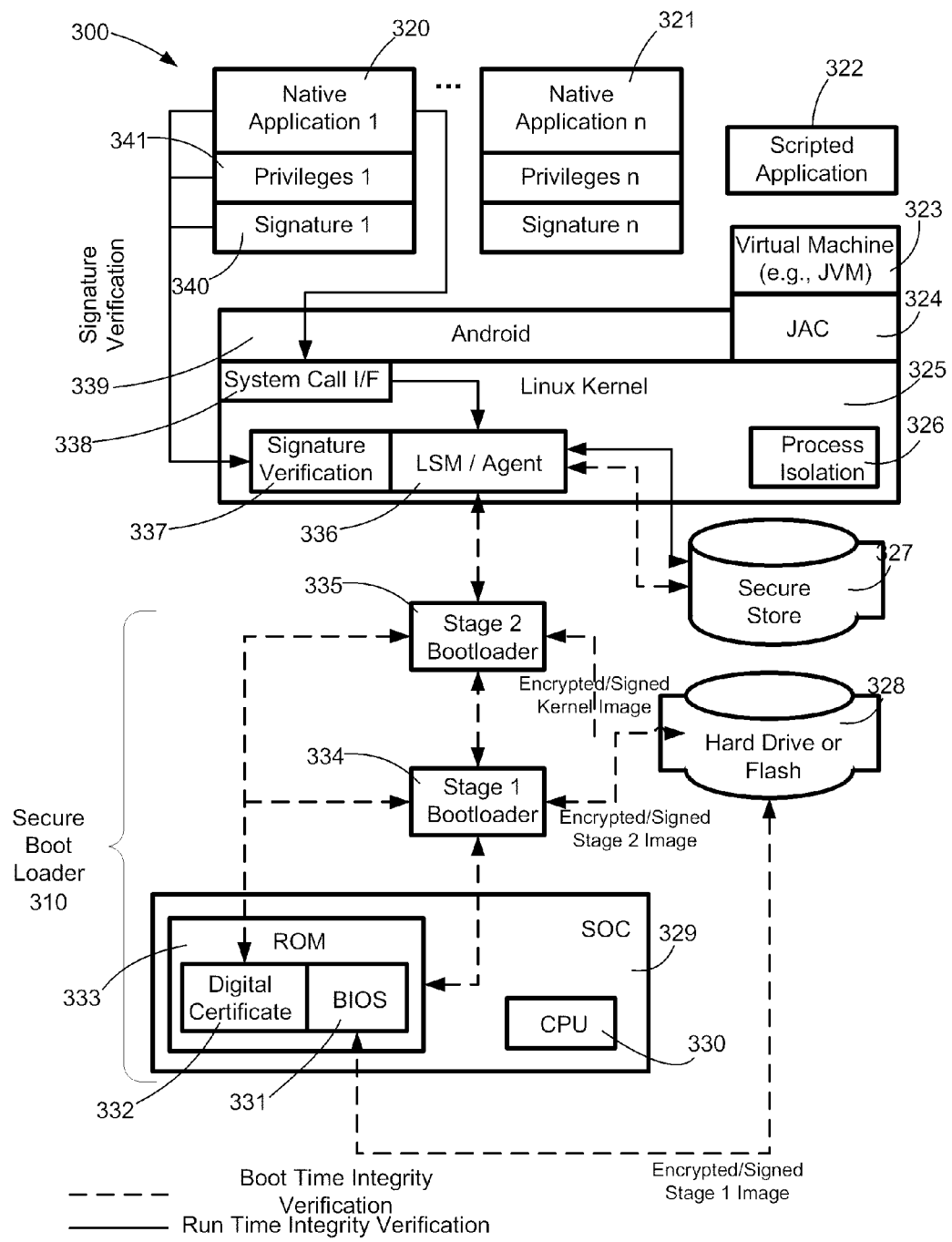
FIG. 3 is a schematic showing certain aspects of dynamic platform security functionality in accordance with the accordance with the embodiment of FIG. 2A.

With regard to FIG. 3, a more detailed schematic 300 of the dynamic platform security functionality is shown in accordance with the generalized stack architecture of the present invention as in FIG. 2. Here, it can be seen clearly, when compared with prior art FIG. 1, how the present invention compliments and can be implemented in conjunction with the known static platform security functionality. As in the previous FIGS. 2A-2C, the base layer includes typical SOC 329 components including a CPU 330 and ROM 333 within which BIOS 331 resides.

In terms of the operations shown in FIG. 3, there is a typical secure boot loader sequence 310 provided as shown. It should be understood that the embodiment of the present invention could leverage existing secure boot technology. It should equally be understood that the boot sequence may equally apply to 1 stage or the many stages there-after. Typically there are 2 boot loading stages 334, 335 in a system as shown in FIG. 3. Generally speaking, bottom up validation of secure boot components occurs as the first component validates the second component before transferring execution control to the next component. This boot time integrity verification is shown by way of dotted lines. Here, the first stage occurs upon device reset, where ROM code is hard wired to the device reset address. The ROM (or boot ROM) 333 loads the next boot stage 334 after verifying that the next boot stage is the intended boot stage. This verification or authentication is performed by computing a digital signature from the HDD or flash memory 328. If the digital signature matches the pre-computed value (as encapsulated in the digital certificate 332 as shown), then the OS boot loader 335 will be loaded into main memory and executed. If the signature does not match the pre-computed value at any stage, execution control will not transfer to the next stage and the device will fail to boot. When the OS boot loader 335 has execution control, the OS boot loader performs 335 a similar operation of validating the OS image from the HDD or flash memory 328. Again, if the computed signature matches the expected pre-computed signature, it will load into memory the OS image and transfer control to the OS image (i.e., the Linux kernel 325 operating in the Android™ OS 339 as shown). The OS image will then initialize, and during this process the agent 336 will also be initialized. While the agent 336 is included in the OS image which is digitally signed, it should be understood that the agent 336 may be updated. This is because signatures are broken down into logical module separation and each module has its own signatures that are checked during the secure boot process. Therefore, any module may be replaced though the signature must be valid and trusted cryptographically with a digital signing private key.

With continued reference to FIG. 3, the OS kernel 325 is shown as the Linux kernel modified for the Android™ OS 339. Here, this specific implementation of the invention uses the Linux Security Module ("LSM"). As mentioned above, LSM is a framework that allows the Linux kernel 325 to support a variety of computer security models while avoiding favoring any single security implementation. LSM provides hooks at every point in the Linux kernel 325 where a user-level system call is about to result in access to an important internal kernel object. LSM can be used to implement a wide range of security functions (e.g., Mandatory Access Control (MAC), On Access Virus Checking).

The agent 326 in accordance with the present invention is also configured to include integrity verification (or simply "IV"). The IV function that is embedded in the agent 326 enables the agent 326 to perform static integrity verification (e.g., on HDD or on flash memory) and dynamic integrity verification (e.g., in random access memory (RAM)). IV is implemented by computing a hash value for an application or system component and then comparing that to a known good value for the hash function. If the calculated value is the same as the stored known good value, then the agent assumes that the component has not been modified by an attacker. However, if the calculated value is different than the stored known good value, then the agent assumes that the component has been modified and can no longer be trusted to perform the functionality that it was intended to perform or that it should no longer have the same privileges that were originally assigned to it.

As shown in FIG. 3, the agent 326 performs IV checks on a number of device software components on an ongoing basis. This "integrity monitoring" is done to detect any unauthorized modification (e.g., tampering) such as the modification, replacement, removal, or additions of components or sub-components that are critical to supporting the security objectives for the system.

Such components monitored via IV by the agent 336 in accordance with the present invention include: ROM BIOS 331; HDD or device flash memory 328; stage 1 bootloader 334; stage 2 bootloader 335; Linux kernel 325 or portions of the Linux kernel; system call interface (I/F) 338; agent 336 including the secure store 327 (during both boot time and run time as indicated, respectfully, by dotted and solid arrows in FIG. 3); native application 320; Android™ OS 339; native Android™ application 321; JAC 324; Android™ (Dalvik) virtual machine 323; Android™ application 322; and application & system provisioning sequence (as further described with regard to FIGS. 4 and 5 below).

Such integrity monitoring (shown by solid arrows) of native application 1 320 is illustrated in FIG. 3. Here, the agent 336 continuously monitors native application 1 320 such that integrity is verified when the native application 1 320 attempts to access system resources through the system call I/F 338. This occurs through signature verification 337 whereby the agent 336 implements IV by comparing signature 1 340 to a known good value corresponding to application 1 resources. In particular, application 1 resources include IV information and the application signing certificate stored in a secure store 327. If the signature 1 value is the same as the stored application signing certificate (i.e., known good value), then the agent 336 assumes that the native application 1 320 has not been modified by an attacker and that its permissions or privileges 341 have not been modified. However, if the signature 1 value is different than the known good value, then the agent 336 assumes that the native application 1 320 has been modified and can no longer be trusted to perform the functionality that it was intended to perform. This process occurs for all native applications that may be present up to native application n 321.

Figure 4:
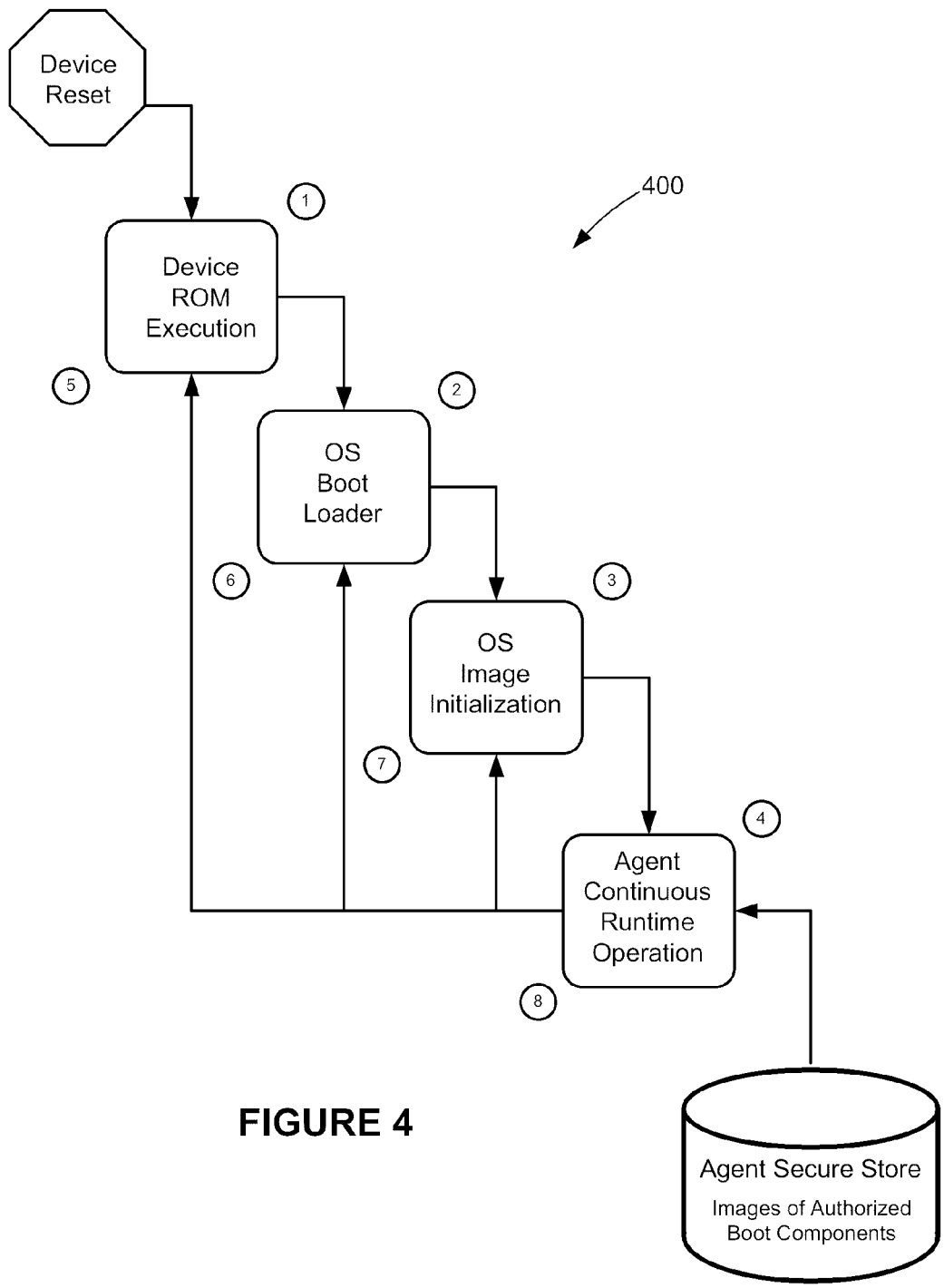
FIG. 4 is a schematic illustrating a typical boot loading sequence in accordance with the embodiment of FIG. 3.

The process isolation block 326 shown in FIG. 3 will be further explained with regard to FIG. 4 where there is illustrated a runtime boot loading sequence 400 in accordance with the present invention. In particular, upon device reset a top down validation (at steps 1, 2, and 3) of secure boot components can be seen. This validation serves to ensure that the OS that is loaded onto the device is the one intended by the OEM or operator and that the OS has the intended functionality. Once the agent gains execution control during initialization (at step 4), the agent will perform IV upon itself along with the previously executed components of the secure boot loader including the boot ROM image, the OS boot loader, and the OS image. If the integrity (from steps 1 through 4) of all of these components is confirmed by the agent by using comparisons to data resident in the agent secure store (at steps 5 though 8), then the agent assumes that the OS that is installed on the device is the intended OS and that certain security functionality that may be performed by the OS has not been modified. However, if the agent determines that one or more of the components cannot be authenticated, the agent may take corrective action.

One possible corrective action taken by the agent is to replace the boot components with a backup image of the intended boot components, then reset the device and start the boot up process again. If the agent detects that the system is invalid after a number of attempts to correct invalid components, then the agent may deny all further access to critical system resources or application resources. It should be readily apparent that the number of attempts is a matter of design choice and therefore a predetermined variable within the intended scope of the present invention. Likewise, the determination of which system resources may be considered critical may be predetermined based upon the given device usage. As well, other corrective actions are possible without straying from the intended scope of the present invention.

Figure 5:
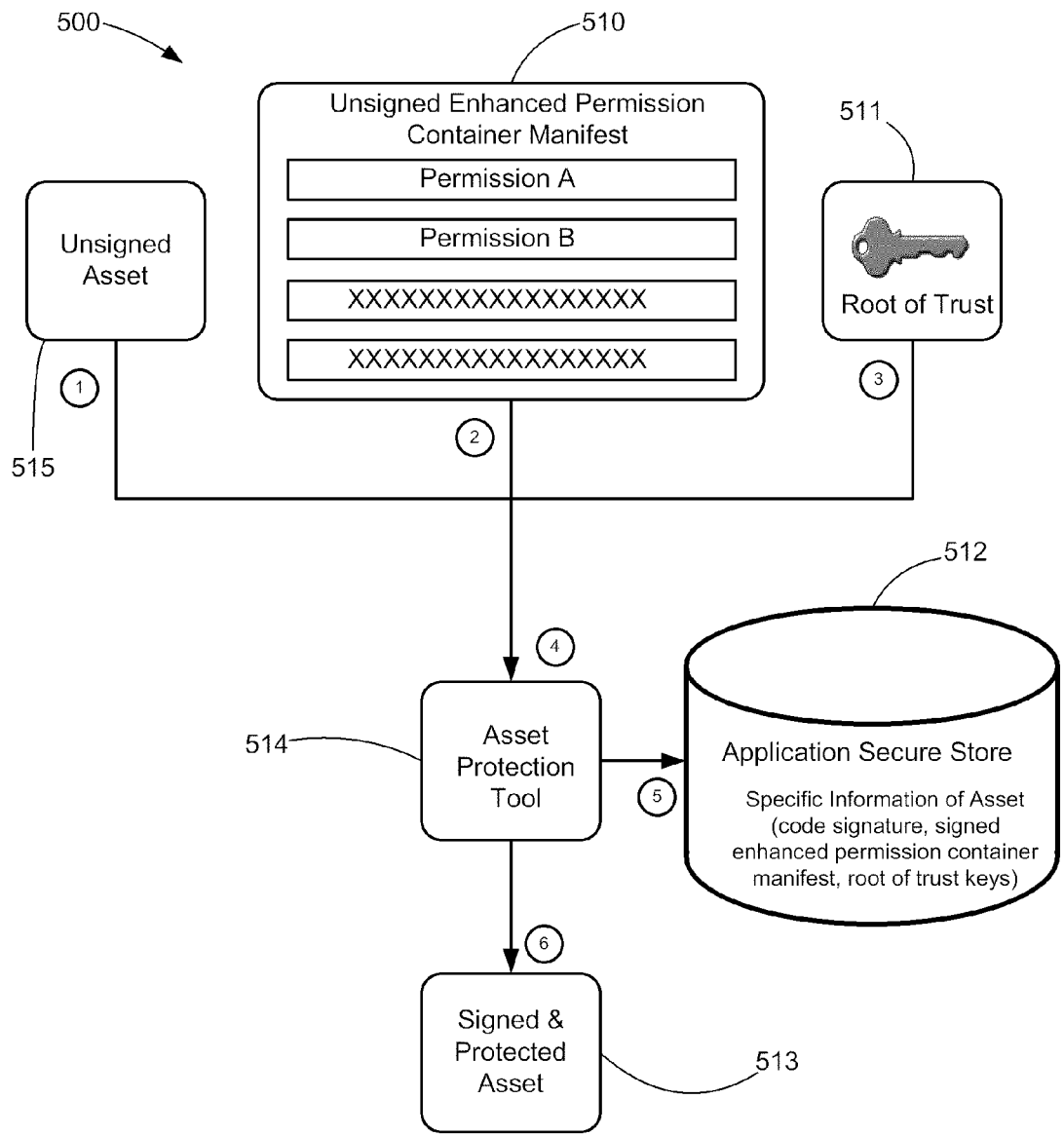
FIG. 5 is a schematic illustrating a provisioning sequence in accordance with the embodiment of FIG. 3.

It should be understood the preceding detailed description presumes that an application already exists and is therefore known to the OEM, operator, Internet-based retail interface provider, and, in turn, known to the agent in accordance with the present invention. However, it is readily apparent that new applications may come into being by a developer. As such, FIG. 5 illustrates the processing that is applied to an application (unprotected) submitted by a developer during the application certification process 500. The agent in accordance with the present invention includes an asset protection tool 514 which is a software tool configured to create and update the encrypted application secure store 512. Here, the asset protection tool 514 stores information to protect the unprotected application. It should be understood that a variety of tamper resistant techniques can be applied to the stored information such as, but not limited to, secure loader and IV, and the use of whitebox cryptography to protect cryptographic secrets at rest (e.g., on disk) and in use (e.g., in-memory).

With further regard to FIG. 5, there is provided an unprotected asset 515 (i.e., new application from a developer) at step 1. Created by the application developer or development system is an unsigned enhanced permission container manifest 510 at step 2. This lists the permissions (A, B, . . . etc.) granted to the application by the certifying authority. Moreover, the permissions are mapped to specific set of kernel system calls. After the unsigned manifest 510 is created, the asset protection tool 514 is configured to generate or use a provided private root of trust key 511 at step 3. The root of trust may be automatically and randomly generated by the asset protection tool. The asset protection tool 514 then signs the unsigned application 515 via the asset protection tool 514 at step 4 and places the result in a signed enhanced permission container manifest that exists within the application secure store 512. Moreover, the signed version of the enhanced permission container manifest is stored at step 5 in the application secure store 512 where information specific to the given asset (e.g., code signature, enhanced permission container manifest, root of trust keys) are placed. The resultant outcome at step 6 is a signed and protected asset 513 in the form of a fully provisioned application. Optionally, the unprotected new application may have a secure loader wrapped around it so as to provide a resulting protected asset with static tampering resistance and be IV enabled.

It should further be understood that not all application types may be provisioned for any particular embodiment of the asset protection tool discussed above. For example, in the present embodiment which is related specifically to the Android™ OS, a typical list of application types that can be provisioned, installed, and subsequently run on the system implementing the present embodiment of the invention may be limited to a native OS application, a native Android™ application, and an Android™ application. Other open OS implementations may of course be possible beyond the specific Android™ OS implementation illustrated herein without straying from the intended scope of the present invention.

The permission information created in the provisioning sequence of FIG. 5 is further used by the agent during installation and runtime of the given application being placed onto the device. Moreover, when the given application code selected from the types of available applications is provisioned the resulting signed enhanced permission container manifest in the application secure store thereby contains all the permissions that the application code requires during runtime. The enhanced permission container manifest specifies the application code signature and the signature of the container itself so as to prevent tampering of the container or application after the application code has been signed.

Figure 6:
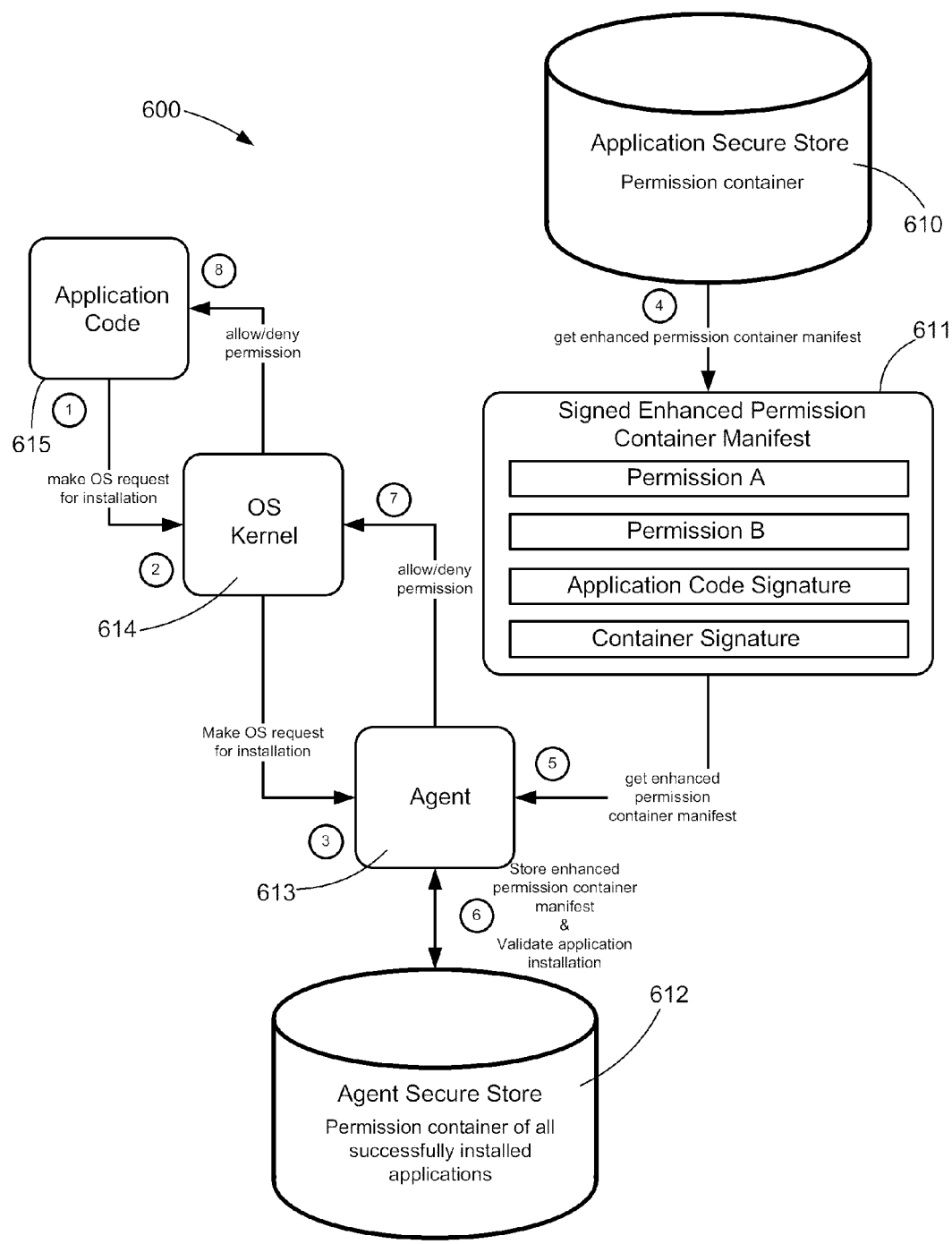
FIG. 6 is a schematic illustrating an installation of application permissions in accordance with the embodiment of FIG. 3.

With regard to FIG. 6, initial installation 600 of application permissions is illustrated. Here, the signed enhanced permission container manifest 611 shown is found within the application secure store 610 that was created during provisioning time in FIG. 5. As previously mentioned, the enhanced permission container manifest 611 is encrypted by the asset protection tool. Accordingly, this facilitates transfer of the enhanced permission container manifest 611 from the application secure store 610 to the agent secure store 612. Both the application secure store 610 and the agent secure store 612 comprise the secure store as generally shown in FIG. 3.

Within the enhanced permission container manifest 611 there exists a permission list (i.e., Permission A, Permission B, . . . etc.). The permission list determines what OS kernel resources can be accessed by the given application code that forms the application being installed and run. The application code signature is used by the agent 613 to IV the application to ensure it has not been modified at the time it makes the OS request for particular kernel permissions, such as "install" requests. The container signature is a reference value for the container itself, and is used by the agent 613 to ensure the contents of the container have not changed. Once the integrity of the OS and the application have been verified, the installed application's enhanced permission container manifest will be stored in the agent secure store 612 for future reference of other permission requests for that application.

With further regard to FIG. 6, the installation sequence includes first sending at step 1 a request to the OS kernel 614 to install an application pursuant to an installer directive from the application code 615. Subsequently, the OS kernel 614 passes along the request to the agent 613 at step 2. The agent 613 validates (via IV as already described above) the OS kernel 614 at step 3. It should be understood as previously noted above, that the agent 613 also validates the OS kernel 614 in an ongoing manner (i.e., as a background process). At step 4, the agent 613 accesses the application secure store 610 to retrieve the signed enhanced permission container manifest 611 therefrom. The agent 613 validates at step 5 the application's signed enhanced permission container manifest through IV using the signed enhanced permission container manifest 611. The agent 613 at step 6 stores the validated application's enhanced permission container manifest into the agent secure store 612 for future reference. Based upon the step 5 validation operation, the agent 613 allows or denies the install to the OS kernel 614 at step 7. In turn, the OS Kernel 614 at step 8 passes the permission (allow or deny) to the installer directive that is installing the application to be installed to ultimately allow or deny installation of the application code 615.

Figure 7:
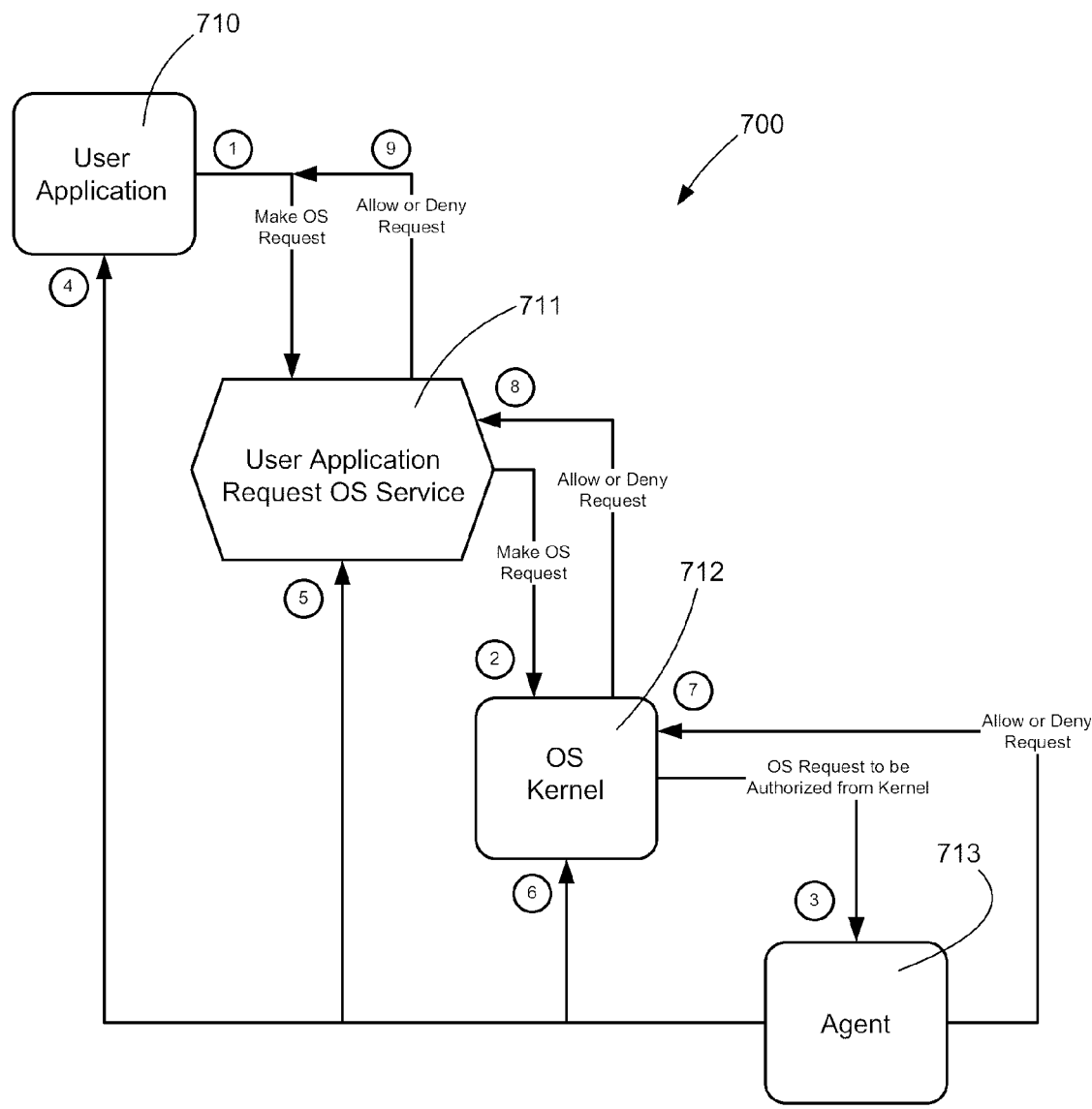
FIG. 7 is a schematic illustrating continuous system integrity during runtime in accordance with the embodiment of FIG. 3.

As mentioned above, the agent validates the OS kernel in an ongoing manner as kernel operations are required. This kernel access control 700 is shown in FIG. 7 in terms of continuous runtime system integrity. Here, the sequence of how the entire system integrity is maintained is shown whenever any application makes an OS request for kernel services. In FIG. 7, an installed and running application (i.e., user application) 710 is shown making a request for OS services or resources 711. This request is passed to the OS kernel 712 and which request is, in turn, passed along to the agent 713 via the LSM functionality that will ultimately allow or deny the request. In accordance with the present invention, the criteria used by the agent 713 to allow or deny the application request may include: system/application integrity, application permissions, application behavior, security context for other applications that may be running, and remote commands (element 216, shown previously in regard to FIG. 2A).

The agent decision criteria related to system/application integrity includes whether tampering has been detected to either system or application components.

The agent decision criteria related to application permissions includes whether the application has the necessary permissions to make such a request. In the Android™ OS, such permissions are declared in a manifest file that is associated with the application. Application developers must declare these permissions and it is up to the consumer to grant or not grant these permissions which may be problematic as consumers are not typically aware of security implications of their actions.

The agent decision criteria related to application's behavior disregards whether an application may have permissions to access certain kernel services and instead relies upon the application's behavior. For example, an application that requests consumer GPS coordinates every 15 seconds and then attempts to send such coordinates to a third party via some messaging protocol such as SMS, could potentially be "spyware." Such behavior therefore may result in request denial even though the application may have permissions associated with the kernel service related to GPS coordinates (i.e., the agent would block access if the application had rights granted to location data, but not rights granted to SMS data).

The agent decision criteria related to the security context of any other applications that may be running also disregards whether an application may have permission to access certain kernel services and instead looks to whether allowing a request when another trusted application is running could negatively affect one or more of these trusted applications. In other words, the agent properly enforces permissions at run time. For example, the requesting application may try to access certain memory or drivers to capture high definition video after a trusted high definition video player application that implements digital rights management has decrypted the video thereby calling into question the appropriateness of the high definition video data usage by the requesting application (i.e., the agent may block access to the screen buffer memory, though allow the playing of the video itself).

The agent decision criteria related to remote commands involve providing the agent the ability to support commands from a remote entity (e.g., a service provider) that could override the applications permissions or privileges. For example, a mobile operator may wish to disable a mobile device that has been stolen. In this case, the agent would also base decisions to provide system access on remote commands that would prevent the device from being used by an unauthorized user of the device. For example, a mobile operator may wish to disable or limit the access an application or applications have to network services or other kernel resources in the event that such an application is causing problems with network reliability or stability (e.g., by generating a high volume of traffic or connections that cannot be sustained by the network). In this case, the agent could override the privileges that the application has or prevent the application from executing at all.

Further, such commands from the remote command controller may be used to limit permissions (e.g., reduce privileges, change privileges, or revoke privileges). Further, such commands from the remote command controller may be used to remove applications from the device, including terminating the application if currently executing, removing the application from memory, or un-installing the application completely. Overall, it is important to note that the present invention may not only serve to "kill" applications, but may also serve to limit access to system resources beyond the access that is implied in the privileges associated with the given application—e.g., even if an application has the privilege to send SMS messages, this is not quantified in the privileges such that when the application sends, for example, 10,000 SMS messages an hour, the agent could "throttle this back" based on some "normal behavior" template stored in the agent secure store or based on remote commands. Still further, the agent may be used to report anomalous behavior back to the remote entity so that, for example, a mobile operator or designated third party could make decisions about what to do (e.g., an application has made X requests for a system resource over some period of time).

Using the aforementioned criteria for ongoing runtime system integrity, the kernel access control 700 shown in FIG. 7 includes an initial OS request by the user application 710 at step 1. In turn, the application at step 2 creates a software interrupt or otherwise creates an event for the OS. In the OS kernel 712, the LSM receives the request 711 (i.e., interrupt/event) and passes the request 711 to the agent 713 at step 3. The agent 713 integrity verifies the application 710 and the permissions at step 4 using the criteria described above. At step 5, the agent 713 validates the user request memory stack. Thereafter, the agent 713 integrity verifies the OS kernel image in memory at step 6. As previously mentioned, IV checks are run on an ongoing basis by the agent 713. This check verifies that the IV process is still running and has not detected any evidence of tampering. Based upon the system validation process (steps 4, 5, and 6), the agent 713 therefore allows or denies the request, and, at step 7, the allowance or denial of the request is passed along to the OS kernel 712. In turn, the OS kernel 712 passes along the allowance or denial of the request at step 8. At such point, the application event returns control back to the application 710 at step 9 with the decision to allow or deny the request.

Figure 8:
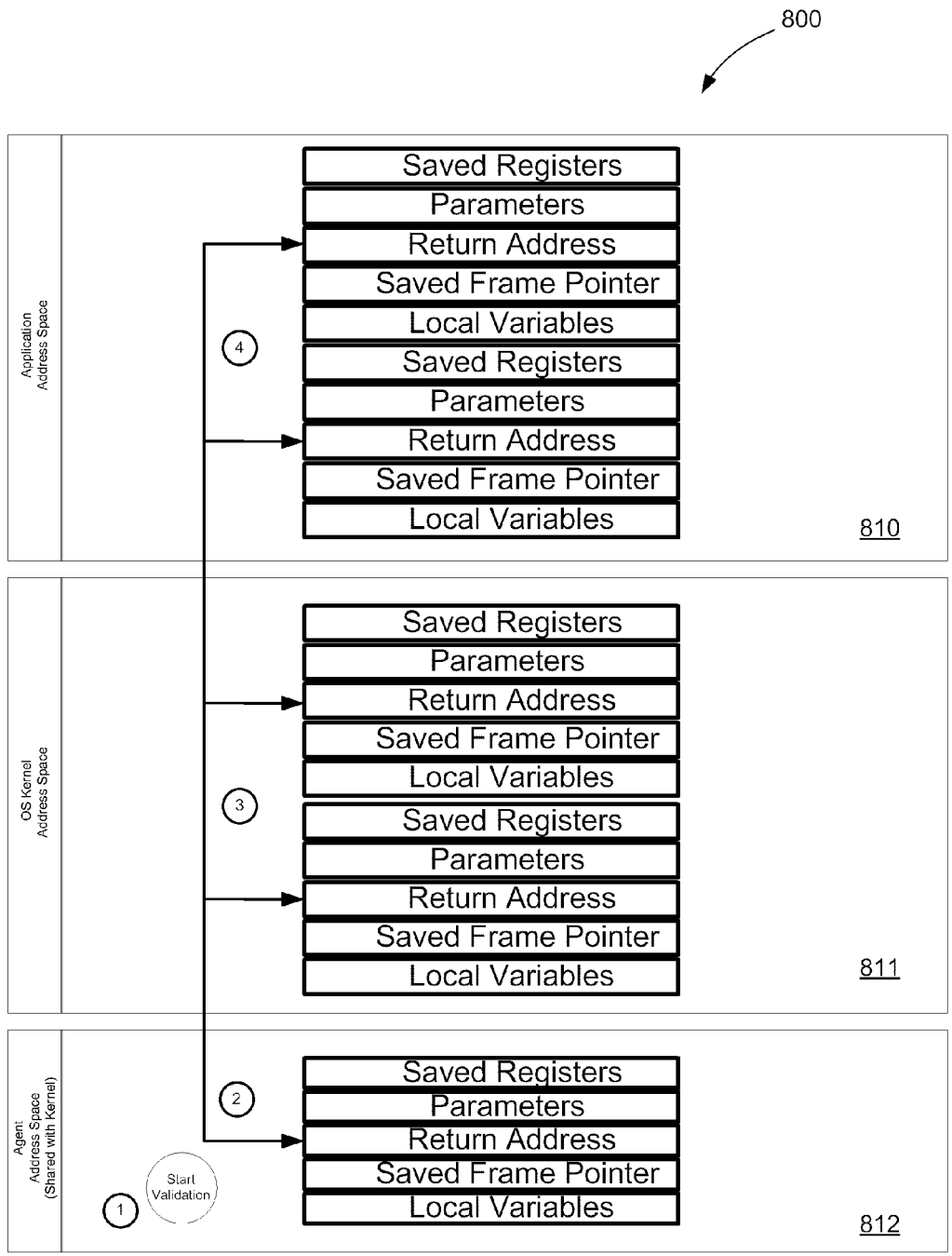
FIG. 8 is a schematic illustrating validation of a user application request during runtime in accordance with the embodiment of FIG. 3.

As in the continuous runtime system integrity of FIG. 7, it should be understood that the application must also be validated in an ongoing manner. Accordingly, there is shown runtime validation of an application request in FIG. 8. In general, an application must not be tampered with in any way or validation here will fail. The stack diagram 800 in FIG. 8 illustrates how the present invention efficiently provides application integrity monitoring while maintaining system integrity at the same time. Here, the address spaces for the agent 812, OS kernel 811, and application 810 are shown. As the agent is embedded in the OS kernel, it should be understood that the agent address space 812 is therefore shared with the OS kernel address space 811. Return addresses in the calling stack are data points into integrity verification information that is contained in the agent. The start of runtime validation (at step 1) of the application involves the agent walking the stack of the request for OS service while validating all return addresses (at steps 2 through 4) and performing integrity verification on the address range utilizing the call stack signature as described below. When an application makes a request for any OS kernel service, the OS kernel passes along this request of a kernel service to the agent. This OS kernel is LSM enabled such that the agent is required to allow or deny the request.

In accordance with the present invention, runtime call stack signature calculation is accomplished using the distance (in bytes) between each return address on the stack to the top of the stack. Table A represents exemplary call stacks for the agent 812, the OS kernel 811, and the application 810.

TABLE A

| Call Stack Signature | Owner | Stack Frame Element Filter "Return Address" | Comments |
| --- | --- | --- | --- |
|  | Agent | Return Address | Current Stack Position (must be Agent Address Space) |
| 12 bytes | Agent | ... | Variable length stack frame |
|  | Agent | Return Address | Calculate the bytes inbetween |
| 23 bytes | OS Kernel | ... | Variable length stack frame |
|  | OS Kernel | Return Address | Calculate the bytes inbetween |
| 44 bytes | OS Kernel | ... | Variable length stack frame |
|  | OS Kernel | Return Address | Calculate the bytes inbetween |
| 10 Bytes | User App | ... | Variable length stack frame |
|  | User App | Return Address | Calculates the bytes inbetween |
|  | User App |  | Top of Stack |

The signature from the above example includes an application unique user ID randomly assigned during installation and a collection of call stack signature bytes as seen in Table B.

TABLE B

| Application Identifier (2-8 bytes) | Call Stack Signature (2-128 bytes) |
| --- | --- |

In terms of the example of TABLE B, the signature of call stack of "Application ID 12032" would be "12032:12:23:44:10" and used in the integrity verification check by the agent.

The depth of the stack is a variable length but not to exceed 128 samples. Also, the depth of the stack between the OS kernel and the agent is known and calculated prior to the application calling the OS kernel services. From this calculation, the agent may determine that all the return addresses on the call stack are included in the integrity verification signature range when the application and system components were provisioned. It should be understood that all the return addresses must be found in the list of signatures of the signed application and system components, which are stored in the agent secure store, in order for the agent to allow the OS to service the application.

As shown in FIG. 8, there is detailed a runtime call stack signature validation sequence. Here, the validation sequence begins at step 1. Thereafter, at step 2, the agent examines the stack and determines the return address which identifies the location of the calling code in the OS Kernel address space 811. Based on the calling code, the agent at step 3 verifies that the caller is legitimate and has recently and successfully had its integrity verified. There may be several layers of this checking in the OS Kernel address space 811, as indicated in FIG. 8. Thereafter, at step 4, a similar return address determination and validation process is performed as calling code in the stack appears from the application address space 810. Again, there may be several layers of this checking in the application address space 810, as shown in FIG. 8.

Figure 9:
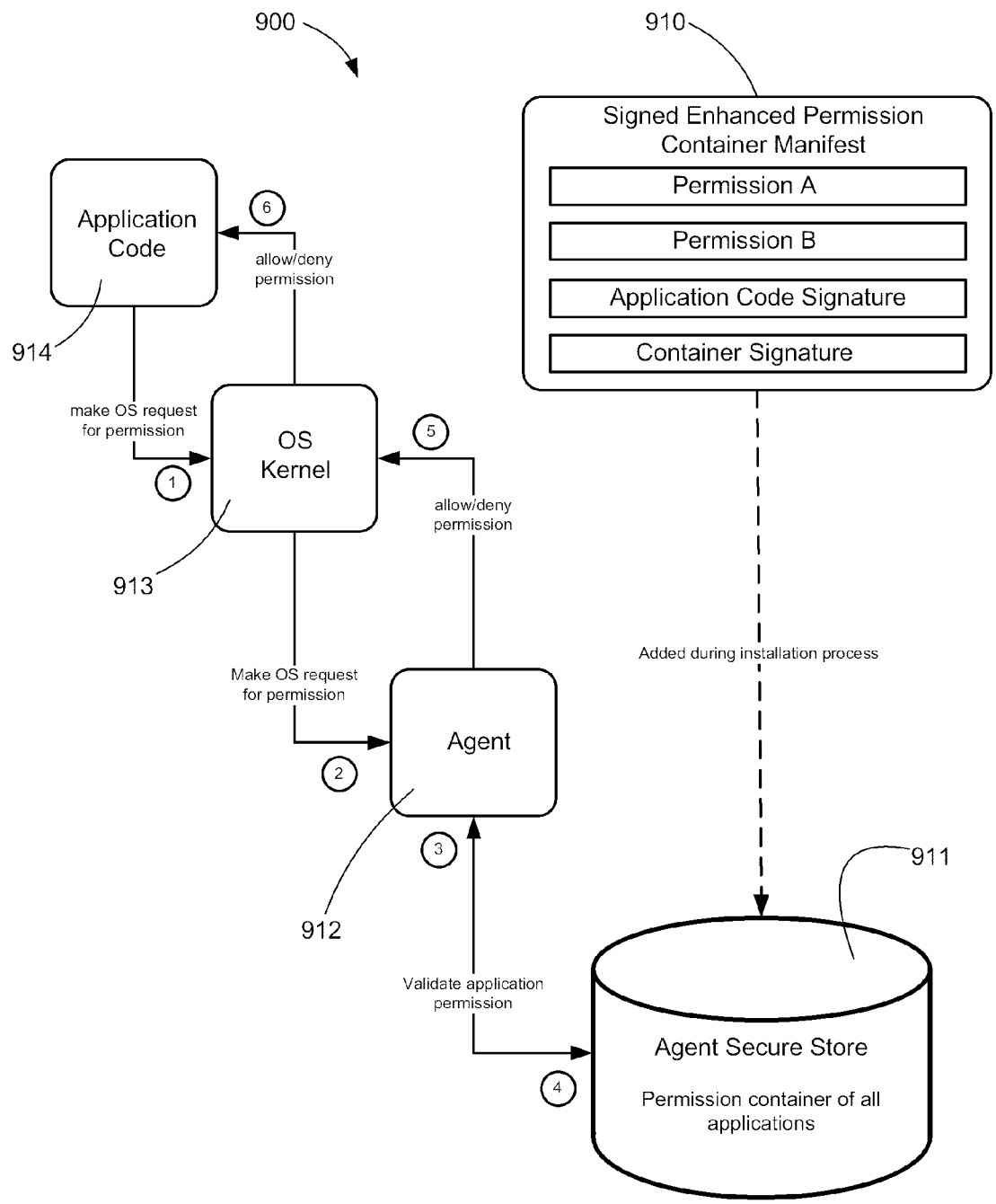
FIG. 9 is schematic illustrating application permission enforcement during runtime in accordance with the embodiment of FIG. 3.

During runtime, it should be understood that application permissions should be enforced on an ongoing basis as applications are subject to dynamic attacks (e.g. portions of an application or its associated permissions could be modified during execution using a debugger). Such application permission enforcement 900 is shown in FIG. 9. Here, any request that an application 914 makes to the OS kernel 913 after installation of the application 914 will be validated using the signed enhanced permission container manifest 910 that is stored in the agent secure store 911. The agent 912 will allow or deny the request based on the integrity of the system and the permission provided in the enhanced permission container 910. The enforcement sequence includes an application 914 making an OS request at step 1 and, at step 2, the OS kernel 913 validates the request with the agent 912. At step 3, the agent 912 validates the OS integrity as already described above.

Step 4 provides that the agent 912 validates the type of OS Kernel request from the signed enhanced permission container manifest 910. It is important here to note that, at run-time, the requesting application is only granted access to OS Kernel services that are contained within the signed enhanced permission container manifest 910 which contains the requested permissions as identified by the application developer prior to submission of the application to certification. Moreover, this mechanism maintains the security and integrity of the system, even if the application developer does not correctly identify all kernel services that their application attempts to access at run time.

Once the agent 912 validates the type of OS Kernel request from the signed enhanced permission container manifest 910, the agent 912 then passes the allow or deny decision based on the validation in the steps 3 and 4 to the OS kernel 913 at step 5. Subsequently, the OS kernel 913 passes such allow or deny decision to the application 914 at step 6 based on the agent decision passed to it.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system for improving security of a device, the system comprising:
   one or more processors; and
   one or more memories operatively coupled to at least one of the one or more processors and having instructions stored thereon that, when executed by at least one of the one or more processors, cause at least one of the one or more processors to:
   embed a secure software agent within an operating system kernel of an operating system executing on the device, wherein the secure software agent is configured to monitor the integrity of at least the operating system and one or more applications configured to execute within the operating system, wherein the secure software agent is integral to the operating system kernel such that the operating system will not function correctly without the secure software agent; and store security information necessary to verify the integrity of at least the operating system and the one or more applications configured to execute within the operating system within a secure data store, wherein the secure data store is accessible solely by the secure software agent.

2. The system as claimed in claim 1, wherein the one or more applications configured to execute within the operating system will not function correctly without the secure software agent.

3. The system as claimed in claim 1, wherein the secure software agent is configured to verify the integrity of the operating system and at least one of the one or more applications configured to execute within the operating system in response to an operating system request by at least one of the one or more applications configured to execute within the operating system.

4. The system as claimed in claim 1, wherein the secure data store comprises one of: a secured storage device external to a storage drive of the device, a secured portion of the storage drive of the device, or a secured memory on a chipset of the device.

5. The system as claimed in claim 1, wherein the secure software agent is configured to utilize security information unique to at least one of the one or more applications configured to execute within the operating system to perform one or more of:

determining a presence of malware within or modification of at least one of the one or more applications configured to execute within the operating system;

identifying unauthorized use of at least one of the one or more applications configured to execute within the operating system;

providing platform access control of at least one of the one or more applications configured to execute within the operating system; or providing secure media playback for at least one of the one or more applications configured to execute within the operating system, wherein the at least one application comprises a media application.

6. The system as claimed in claim 1, wherein the secure software agent is configured to update in response to any one of:

indication of previously unknown security threats;

indication of a successful attack by a security threat; or identification and analysis of a successful attack by a security threat or of an attack in development.

7. The system as claimed in claim 1, wherein at least one of the one or more applications configured to execute within the operating system is a media application and wherein the secure software agent is configured to control or limit access to resources of the operating system kernel where such access allows unauthorized use of the media application or media played by the media application.

8. The system as claimed in claim 7, wherein the secure software agent is configured to override known privileges of at least one of the one or more applications configured to execute within the operating system.

9. The system as claimed in claim 7, wherein at least one of the one or more applications configured to execute within the operating system is a media player and wherein the secure software agent is configured to preclude one or more other applications from accessing a media rendering path, including a frame buffer, used by the media player.

10. The system as claimed in claim 7, wherein the secure software agent is configured to preclude access by at least one of the one or more applications configured to execute within the operating system upon either:

an indication of the operating system kernel being compromised; or an indication that the at least one application configured to execute within the operating system is automatically providing privacy related data of the device to an unauthorized remote server, wherein the privacy related data includes user specific data comprising one or more of: locational data indicative of device user location, device user call history, device user email data, device user photographic data, device user contact book data, or device user personal data.

11. The system as claimed in claim 1, wherein the secure software agent is configured to verify that a secure boot process was implemented.

12. The system as claimed in claim 1, wherein the secure software agent is configured to perform a runtime call stack signature validation sequence including:

examining a call stack to determine a return address identifying a calling code location from an address space;

verifying, based on the calling code location, legitimacy of a caller corresponding to the return address; and repeating the examining and verifying from an application address space.

13. The system as claimed in claim 1, wherein the secure software agent is configured to support commands from a remote entity so as to override predetermined permissions granted to at least one of the one or more applications configured to execute within the operating system, wherein the commands include one or more of:

disabling the device;

limiting operation of the at least one application configured to execute within the operating system;

limiting the predetermined permissions granted to the at least one application configured to execute within the operating system;

removing the at least one application configured to execute within the operating system from the device;

terminating operation of the at least one application configured to execute within the operating system; or removing the at least one application configured to execute within the operating system from memory of the device.

14. The system as claimed in claim 13, wherein the secure software agent is configured to report anomalous behavior back to the remote entity.

15. A method for improving security of a device, said method comprising:

embedding a secure software agent within an operating system kernel of an operating system executing on the device, wherein the secure software agent is configured to monitor the integrity of at least the operating system and one or more applications configured to execute within the operating system, wherein the secure software agent is integral to the operating system kernel such that the operating system will not function correctly without the secure software agent; and storing security information necessary to verify the integrity of at least the operating system and the one or more applications configured to execute within the operating system within a secure data store, wherein the secure data store is accessible solely by the secure software agent.

16. The method of claim 15, wherein the one or more applications configured to execute within the operating system will not function correctly without the secure software agent.

17. The method of claim 15, wherein the secure software agent is configured to verify the integrity of the operating system and at least one of the one or more applications configured to execute within the operating system in response to an operating system request by at least one of the one or more applications configured to execute within the operating system.

18. The method of claim 15, wherein the secure data store comprises one of: a secured storage device external to a storage drive of the device, a secured portion of the storage drive of the device, or a secured memory on a chipset of the device.

19. The method of claim 15, wherein the secure software agent is configured to utilize security information unique to at least one of the one or more applications configured to execute within the operating system to perform one or more of:
- determining a presence of malware within or modification of at least one of the one or more applications configured to execute within the operating system;
- identifying unauthorized use of at least one of the one or more applications configured to execute within the operating system;
- providing platform access control of at least one of the one or more applications configured to execute within the operating system; or
- providing secure media playback for at least one of the one or more applications configured to execute within the operating system, wherein the at least one application comprises a media application.

20. The method of claim 15, wherein the secure software agent is configured to update in response to any one of:
- indication of previously unknown security threats;
- indication of a successful attack by a security threat; or
- identification and analysis of a successful attack by a security threat or of an attack in development.

21. The method of claim 15, wherein at least one of the one or more applications configured to execute within the operating system is a media application and wherein the secure software agent is configured to control or limit access to resources of the operating system kernel where such access allows unauthorized use of the media application or media played by the media application.

22. The method of claim 21, wherein the secure software agent is configured to override known privileges of at least one of the one or more applications configured to execute within the operating system.

23. The method of claim 21, wherein at least one of the one or more applications configured to execute within the operating system is a media player and wherein the secure software agent is configured to preclude one or more other applications from accessing a media rendering path, including a frame buffer, used by the media player.

24. The method of claim 21, wherein the secure software agent is configured to preclude access by at least one of the one or more applications configured to execute within the operating system upon either:
- an indication of the operating system kernel being compromised; or
- an indication that the at least one application configured to execute within the operating system is automatically providing privacy related data of the device to an unauthorized remote server, wherein the privacy related data includes user specific data comprising one or more of: locational data indicative of device user location, device user call history, device user email data, device user photographic data, device user contact book data, or device user personal data.

25. The method of claim 15, wherein the secure software agent is configured to verify that a secure boot process was implemented.

26. The method of claim 15, wherein the secure software agent is configured to perform a runtime call stack signature validation sequence including:
- examining a call stack to determine a return address identifying a calling code location from an address space;
- verifying, based on the calling code location, legitimacy of a caller corresponding to the return address; and
- repeating the examining and verifying from an application address space.

27. The method of claim 15, wherein the secure software agent is configured to support commands from a remote entity so as to override predetermined permissions granted to at least one of the one or more applications configured to execute within the operating system, wherein the commands include one or more of:
- disabling the device;
- limiting operation of the at least one application configured to execute within the operating system;
- limiting the predetermined permissions granted to the at least one application configured to execute within the operating system;
- removing the at least one application configured to execute within the operating system from the device;
- terminating operation of the at least one application configured to execute within the operating system; or
- removing the at least one application configured to execute within the operating system from memory of the device.

28. The method of claim 27, wherein the secure software agent is configured to report anomalous behavior back to the remote entity.

* * * * *